T867011

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 749

824,307

PHOTOGRAPHIC ELEMENT CONTAINING A DEVELOPING AGENT AND A WATER-INSOLUBLE ZINC SALT

Anthony Malcolm Barnett, 41 Bushey Grove Road, Bushey, Herts, England; Richard Franklin Bulgin, 37 Hastings Way, Croxley Green, Herts, England; Malcolm Smith, 33 Walton Drive, Harrow, Middlesex, England; and Ilona Roza Dicker, 16 Barnes Ave., Chesham, Buckinghamshire, England

Filed May 13, 1969. Published Oct. 21, 1969

Int. Cl. G03c *1/48, 1/06*

U.S. Cl. 96—61

No Drawing. 24 Pages Specification

A photographic element comprising a support having thereon a photographic silver halide emulsion, a water insoluble zinc salt, such as zinc carbonate, zinc phosphate or zinc silicate and a silver halide developing agent provides improved stabilization in stabilization processing. A process employing such an element can comprise (a) developing with an alkaline activator and (b) stabilizing the resulting developed emulsion layer with a stabilizing agent, such as an aqueous solution of ammonium thiocyanate. Zinc hydroxide can be employed in a photographic element containing a silver halide emulsion and a silver halide developing agent, such as an element for stabilization processing. A developing agent in a photographic paper for stabilization processing can be in a baryta layer and/or some other suitable location, such as in a photographic emulsion.